United States Patent [19]

Addicks

[11] 4,144,773

[45] Mar. 20, 1979

[54] BICYCLE SPROCKET WHEEL

[76] Inventor: Lyle F. Addicks, 12313 Brookshire Ave., Downey, Calif. 90242

[21] Appl. No.: 818,316

[22] Filed: Jul. 25, 1977

Related U.S. Application Data

[63] Continuation-in-part of Ser. No. 696,428, Jul. 12, 1976, abandoned.

[51] Int. Cl.$^2$ .................. F16H 55/12; F16H 55/30
[52] U.S. Cl. ........................... 74/243 DR; 74/447;
74/DIG. 10; 74/230.4; 74/230.3; 403/3;
403/365
[58] Field of Search ....... 74/243 R, 243 DR, 243 PC,
74/217 B, 443, 446, 447, DIG. 10, 230.3, 230.8,
439, 448; 403/3, 365; 29/159 R, 159.2, 159.3

[56] References Cited

U.S. PATENT DOCUMENTS

| 601,990 | 4/1898 | Suter | 74/447 |
|---|---|---|---|
| 2,948,055 | 9/1960 | Baxter et al. | 29/159.3 |
| 3,477,303 | 11/1969 | Brilando | 74/243 |
| 3,550,465 | 12/1970 | Maeda | 74/240 |
| 3,835,729 | 9/1974 | Tarutani | 74/611 |
| 3,838,929 | 10/1974 | Burrell | 74/447 |
| 4,078,445 | 3/1978 | Kiser, Jr. | 74/243 DR |

FOREIGN PATENT DOCUMENTS 2337074  7/1977  France ........................ 74/243

*Primary Examiner*—Samuel Scott
*Assistant Examiner*—William R. Henderson
*Attorney, Agent, or Firm*—John T. Matlago

[57] ABSTRACT

A bicycle sprocket wheel comprises a toothed outer annular member molded of a tough nylon plastic and a centrally disposed metal spider having a plurality of radial arms attached to the sides of the annular member to add structural rigidity thereto. The teeth of the annular member are formed with straight front and back faces and with sharp corners at the roots thereof. Such a construction reduces the cost of the mold used for molding the annular member since the cavity needed therein for the teeth can be simply machined by use of straight and circular cuts. The inner radial edge of the annular member is shaped by an insert in the mold to form sets of circumferentially spaced arcs, the arcs of each set having a common radius different from the other sets to accomodate spiders having arms of different radial lengths.

6 Claims, 15 Drawing Figures

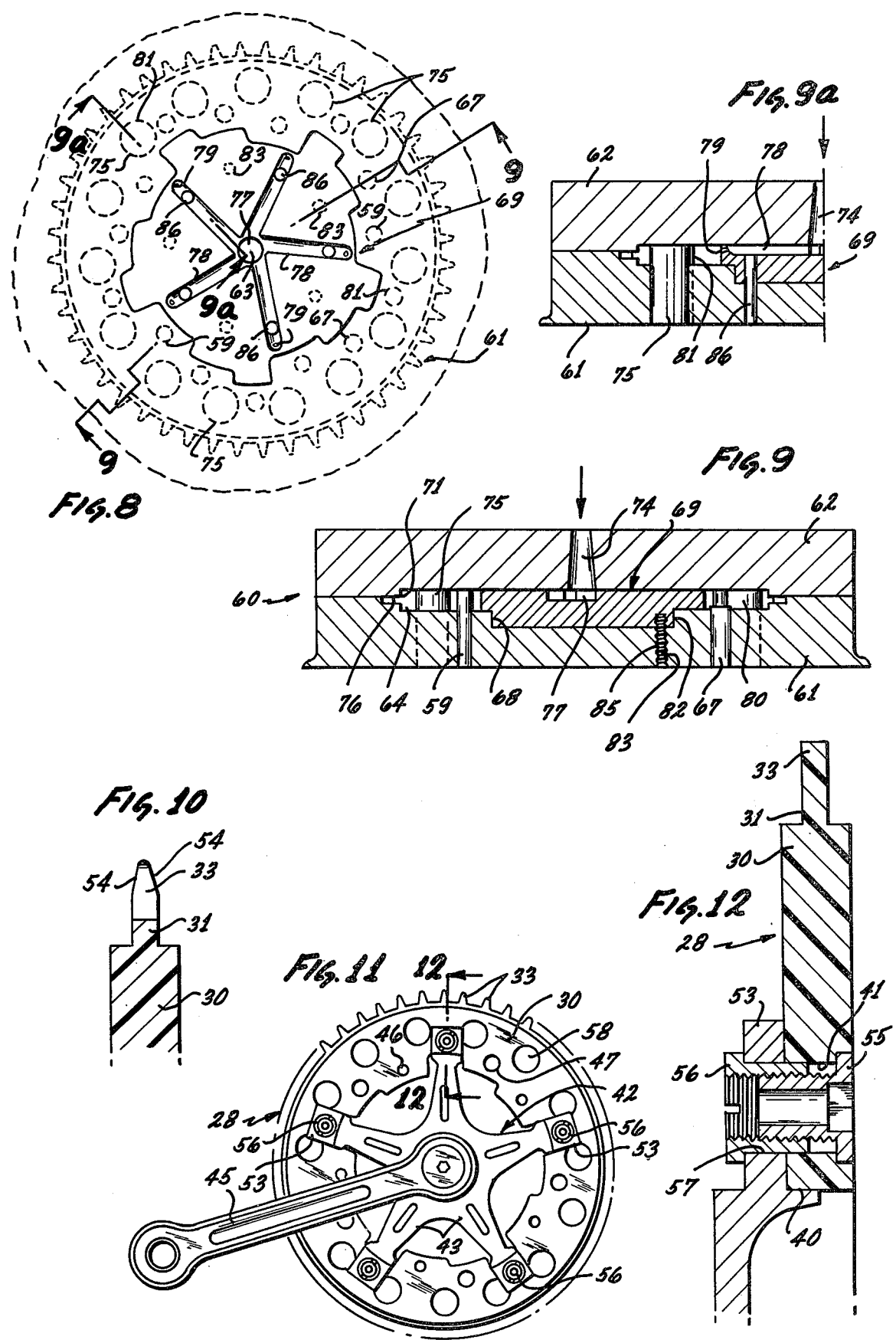

BICYCLE SPROCKET WHEEL

CROSS REFERENCE TO RELATED APPLICATION

This application is a continuation-in-part of copending application Ser. No. 696,428 filed July 12, 1976.

BACKGROUND OF THE INVENTION

This invention relates to bicycle sprocket wheels and more particularly to an improved structure therefor.

A bicycle sprocket wheel is conventionally cut from metal such as a steel plate so as to provide a rigid structure for driving the roller chain which is coupled to drive the rear wheel of the bicycle. In order to facilitate the transmission of the load from the sprocket wheel to the roller chain, the front and back faces of the sprocket teeth are curved and the roots of the teeth are rounded to enable the oncoming rollers of the roller chain to fully seat down against the successive teeth of the rotatably driven sprocket wheel.

Among the disadvantages of using a metal sprocket wheel on a bicycle are that it is inclined to be noisy because of the chordal action of the roller chain as it is advanced by the sprocket wheel. This chordal action also results in wear on the teeth of the sprocket wheel which together with the tendency of the links of the roller chain to stretch causes the sprocket wheel to impart an interrupted jarring motion to the roller chain which further hastens the wear. Furthermore, it is difficult to provide lubrication on the metal sprocket teeth and roller chain resulting in wear of these parts.

SUMMARY OF THE INVENTION

In accordance with the present invention, a bicycle sprocket wheel is formed of a tough plastic toothed annular member having a centrally disposed metal spider attached to the sides thereof. The metal spider provides for adding structural rigidity to the plastic annular member. In order to reduce the cost of machining the mold for molding the annular member of the sprocket wheel of the present invention, the shape of the radially extending teeth on the periphery of the annular member is modified from that provided on metal sprocket wheels. Thus, whereas metal sprocket wheels for bicycles conventionally have teeth with curved front and back faces and rounded roots, the teeth of the sprocket wheel of the present invention are formed with straight flat faces and backs and with sharp corners at the roots thereof. This greatly reduces the cost of the mold used for the sprocket wheel since tha cavity needed therein for molding the teeth can be simply machined by use of straight and circular cuts.

Accordingly, one of the objects of the present invention is to provide an improved bicycle sprocket wheel wherein the peripheral portion including the teeth thereof is molded of a tough plastic material having a high impact resistance.

Another object of the present invention is to provide an improved bicycle sprocket wheel having a plastic outer annular portion whose tooth structure is simplified to facilitate the machining of the cavity in a mold used for the injection molding thereof.

Yet another object of the present invention is to provide an improved bicycle sprocket wheel which comprises a plastic toothed annular member having a centrally disposed metal spider with radial arms attached to its sides to add structural rigidity thereto.

Still another object of the present invention is to provide a bicycle sprocket wheel having a molded plastic toothed annular member whose inner peripheral surface is shaped to enable the attachment of the radial arms of any of several different size metal spiders to the sides thereof.

Still another object of the present invention is to provide a bicycle sprocket wheel having an improved structure for use with a conventional roller chain.

These and other objects, features and advantages of the present invention will be made more readily apparent from the following detailed description of the preferred embodiment as illustrated in the accompanying drawings.

BRIEF DESCRIPTION OF THE DRAWINGS

FIG. 8 is a plan view showing in solid lines an insert provided on the movable platen to form the inner edges of the sectors of the annular member of the sprocket wheel;

FIG. 9 is a sectional view of the mold assembly which shows the movable platen as taken along line 9—9 of FIG. 8;

FIG. 9a is a sectional view of the mold assembly which shows the movable platen as taken along line 9a—9a of FIG. 8;

FIG. 10 is a view of the sprocket tooth shown in FIG. 4a after the upper sides thereof have been beveled during the initial breaking in period while in use on a bicycle;

FIG. 11 is a view of the sprocket wheel of the present invention having a metal spider of a different configuration attached to the plastic annular member thereof; and FIG. 12 is a sectional view taken along lines 12—12 of FIG. 1.

DESCRIPTION OF THE PREFERRED EMBODIMENT

Figure 1:
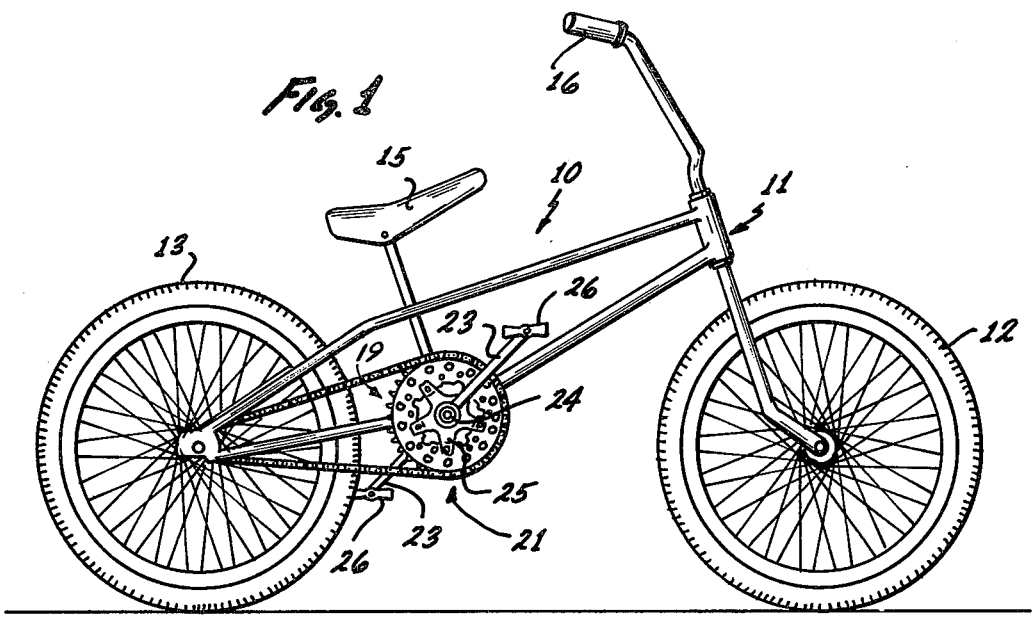
FIG. 1 is an overall view of a bicycle embodying the driving sprocket wheel of the present invention.

Referring to the drawings, in FIG. 1 a bicycle 10 is shown comprising a main frame 11, a front wheel 12, a rear wheel 13, a seat 15 and handle bars 16. Rotatably mounted on the frame 11 below the seat 15 is a driving sprocket wheel 19 which is coupled by a roller chain 21 to drive a smaller sprocket wheel, not shown, provided on the rear wheel 13. Cranks 23 provided on either side of the hub 24 of the sprocket wheel 19 have pedals 26 on the ends thereof. Thus, by treading the pedals 26, the rider of the bicycle 10 drivingly rotates the sprocket wheel 19 to advance the roller chain 21. The bicycle is preferably of the type used for racing.

Figure 4A:
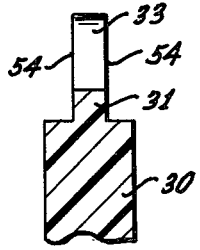
FIG. 4a is an enlarged view of the sprocket tooth and peripheral wheel portion shown in FIG. 4.
Figure 2:
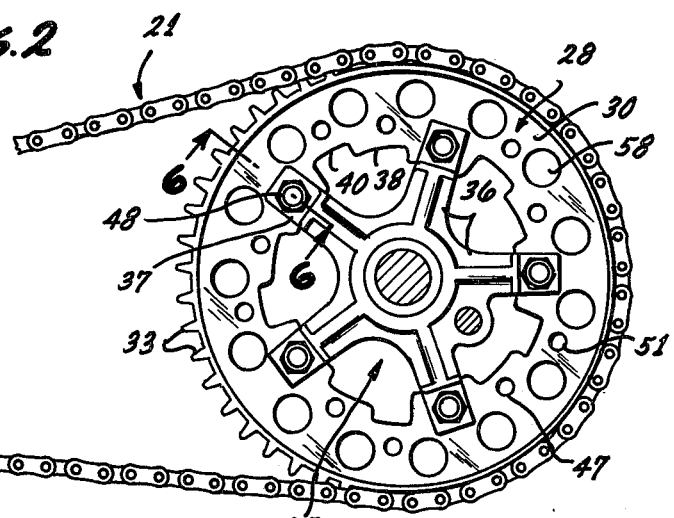
FIG. 2 is an enlarged view of the sprocket wheel and roller chain shown in FIG. 1.
Figure 3:
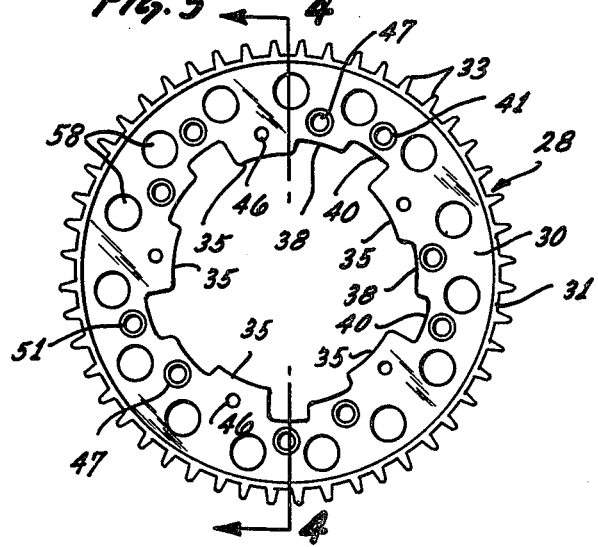
FIG. 3 is an enlarged view of the sprocket wheel annular member showing the side opposite that shown in FIG. 2.
Figure 4:
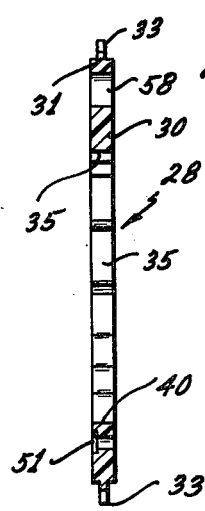
FIG. 4 is a cross sectional view taken along line 4—4 in FIG. 3.
Figure 6:
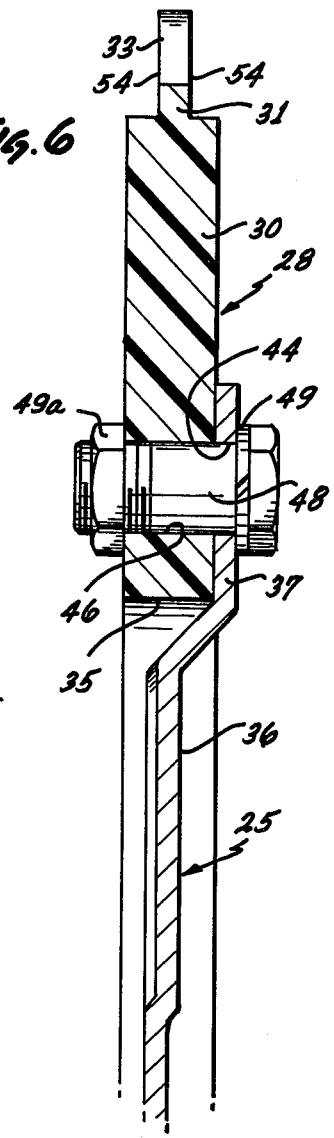
FIG. 6 is a sectional view taken along line 6—6 in FIG. 2.
Figure 7:
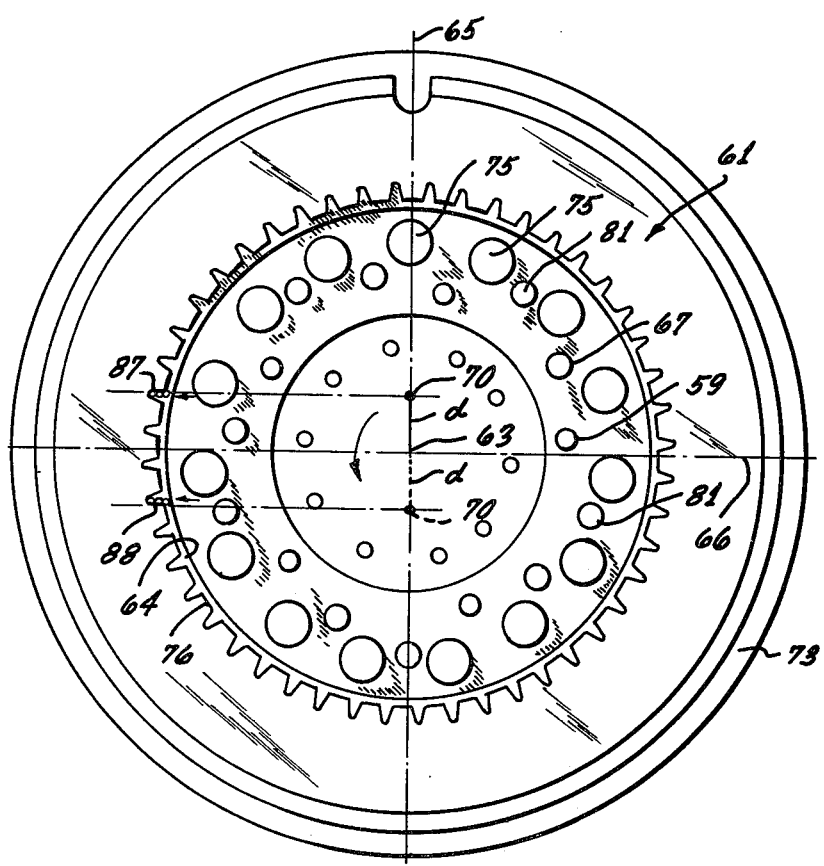
FIG. 7 is a plan view of the movable platen used for molding the plastic annular member of the sprocket wheel.

The present invention provides improvements in the bicycle of the structure of the sprocket wheel 19 in combination with the roller chain 21. As shown in FIG. 2, sprocket wheel 19 comprises a plastic outer annular member 28 having a centrally disposed metal spider 25 attached thereto. The metal spider 25 is punched from a steel plate to provide five equally angularly spaced arms 36. Each arm 36 has an offset end portion 37 with a hole 44 thereon (FIG. 6). As shown in FIGS. 3 and 4, the molded plastic annular member 28 comprises a body portion 30 with flat side surfaces and with a thinner rim portion 31 on the periphery thereof having teeth 33 extending radially therefrom. The axial width or thickness of the rim portion 31 and the teeth 33 is approximately one third the width of the body portion 30 which equally extends beyond either side thereof. The body portion 30 of the annular member 28 is thickened or otherwise shaped to add structural rigidity to the rim portion 31 and the teeth 33 when subjected to side forces. The body portion 30 of the outer annular member 28 radially extends inwardly approximately one third the overall radius of the sprocket wheel 19.

The inner peripheral edge of the annular member 28 is molded with a set of five arcs 35 which are equally angularly spaced apart and disposed at the same radius to accomodate the offset end portions 37 on the five arms 36 of the spider 25. As illustrated in FIG. 6, attachment holes 46 are molded in the sectors of the body portion 30 defined by the arcs 35. These holes 46 are aligned with the holes 44 in the offset end portions 37 of each of the arms 36 of the spider 25. A bolt 48 having a lock washer 49 under its head is fitted into each pair of aligned holes 44 and 46 and secured by a nut 49a on the end thereof.

In addition to the set of five arcs 35, the inner peripheral edge of the annular member 28 is molded with two other sets of five arcs 38 and 40, the arcs in each set being equally angularly spaced apart and disposed at a different common radius to accomodate the offset end portions of the five arms of a different size spider. Holes 47 and 41 are molded in the sectors of the body portion 30 defined by the arcs 38 and 40, respectively. Thus, FIG. 11 shows a spider 42 which differs from spider 25 in having longer arms 43 and in having a crank 45 integrally forged therewith. The spider 42 is attached with the offset portions 53 of each of its arms 43 adjacent one of the arcs 40 on the inner peripheral edge of the annular member 28. Each of the holes 41 in the body portion 30 has one end thereof countersunk to fittingly receive the head of a fastener member 55 whose body is threadably engaged in the body of a fastener member 56 fitted in the hole 57 provided on the offset end portion 53 of arm 43.

Figure 5:
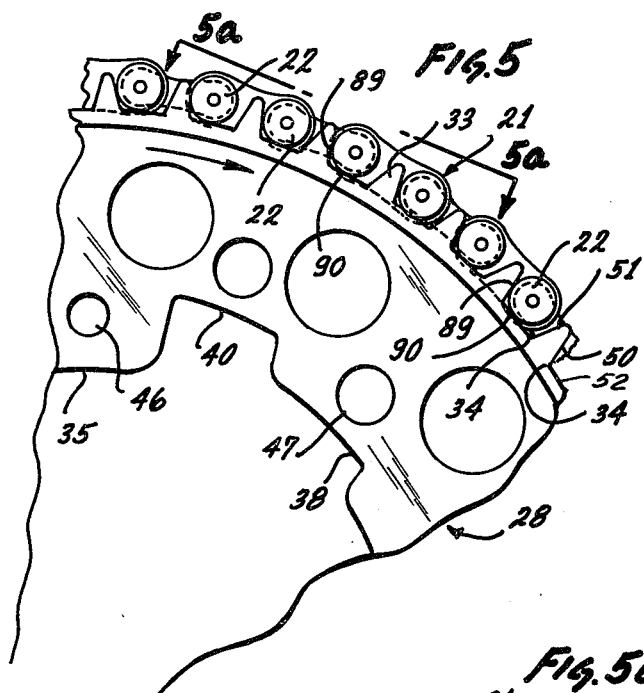
FIG. 5 is an enlarged partial view showing the rollers of the roller chain engaging the teeth on the peripheral surface of the annular member of the sprocket wheel.

It should be noted in FIG. 5 that the teeth 33 of the molded annular member 28 are provided with straight front and back faces 50 and 51, respectively, and the root or base on each side of the tooth 33 makes a sharp corner 34 with a portion of a common circumferential surface 52 which joins the bases of the adjacent teeth 33. Furthermore, on the annular member 28, as initially injection molded, the axial sides 54 of the teeth 33 are straight and parallel, as best shown in FIGS. 4a and 6.

Reference will next be made to the mold 60 shown in FIGS. 7, 8, 9, and 9a to injection mold the plastic annular member 28 of the sprocket wheel 19. The mold comprises a movable platen 61 and a fixed platen 62. To machine the platen 61, a generally cylindrical blank may be mounted for rotation on a lathe, for example. A circular recess 64 is then machined thereon having a radius corresponding to the shoulder formed by the body portion 30 on one side of the teeth 33 of annular member 28 and having a depth corresponding to the axial dimension of the shoulder and the teeth. A circular recess 76 is then machined therein having a radius and depth corresponding to the rim portion 31. A circular recess 68 of smaller radius is then machined from the central portion of the blank to accomodate an insert 69 (FIG. 8) used to form the inner peripheral edge of the annular member 28.

To machine the cavity in the mold to form the teeth of annular member 28, the movable platen 61 is positioned on an index plate 73 (FIG. 7) mounted on the table of a milling machine, not shown, with its center 63, which is also the center of the index table 73, initially aligned with the rotating axis of a 3/32 of an inch diameter cutter 70 mounted in the vertical spindle of the milling machine. The index plate 73 is set to divide the circumference of the blank used to form the platen 61 into an equal member of angular increments depending on the number of teeth 33 desired on the periphery of the annular member 28 which may be anywhere from 39 to 48 teeth.

The milling machine table is then laterally offset from the vertical axis of the cutter 70 by moving it forwardly along the path 65 of its lateral guideway until the center 63 of the platen 61 is displaced a distance d (solid line) equal to 1.032 of an inch from the vertical rotating axis of the cutter 70. The milling machine table is then advanced along the path 66 of its longitudinal guideway, which is perpendicular to the lateral guideway 65, so as to enable the offset rotating cutter 70 to machine a groove 87 in the outer periphery of the circular recess 76 to a depth corresponding to the axial dimension of a tooth 33 and for a distance equal to the length of the face of the tooth. The milling machine table is then returned along the path 66 of its longitudinal guideway just enough to enable the cutter 70 to clear the periphery of the circular recess 76 in platen 61. Then, each time the index plate 73, and thus the platen 61, is rotated a fixed angilar increment about its center 63, the milling machine table is longitudinally advanced along the path 66 to enable the offset rotating cutter 70 to machine another groove 87 in the outer rim periphery of the platen 61 corresponding to the working face 87 of a successive tooth 33.

After all the working faces on one side of the teeth 33 are cut in this manner, the milling machine table is then laterally offset from the vertical axis of the rotating cutter 70 in the opposite direction by moving it rearwardly along the path 65 of its lateral guideway until the center 63 of platen 61 is displaced a distance d (dotted line) equal to 1.032 of an inch from the rotating axis of the cutter 70.

The platen 61 and the index plate 73 are then initially rotatably adjusted about their center 63 a small amount, as needed, such that when the milling machine table is advanced along the path 66, the offset rotating cutter 70 machines a groove 88 in the periphery of the movable platen 61 corresponding to the back face of a tooth 33. The milling machine table is then returned along its longitudinal guideway path 66 just far enough to enable the cutter 70 to clear the periphery of the circular recess 76 in platen 61. Then each time the index plate 73 is angularly incrementally advanced about its center 63, the milling machine table is advanced along the path 66 of its longitudinal guideway to enable the offset rotating cutter 70 to machine a groove 88 in the periphery of the movable platen member 61 which forms a surface corresponding to the back face of a successive tooth 33. Any of the metal left in the teeth cavity between the grooves is then removed. Holes corresponding to the locations of material-saving holes 58 and the attachment holes 46, 47 and 41 in annular member 28 are then drilled in the wall of the movable platen 61 to permit respective pins 75, 59, 67 and 81 to be inserted therethrough and through the cavity 80.

The insert 69 for the movable platen 61 is shown in FIGS. 8, 9, and 9a. Since the inner edge of the molded annular member 28 is shaped with three sets of five arcs, each set having a different common radius to accomodate the different length arms on the spiders to be attached thereto, the outer periphery of the insert 69 is machined in accordance with this pattern of arcs. A hole 77 is drilled in the center of the insert 69 and five equally angular spaced radial grooves corresponding to runners 78 extend from hole 77, each communicating with a hole 79 which forms a gate on the periphery of the insert 69. The bottom of the insert 69 is turned to a radius 82 so as to fit in the circular recess 68 machined in the movable platen 61 and is provided with five blind holes 83 to receive screws 85 by which it is attached to the movable platen 61. Note that this insert 69 is positioned such that the pattern of arcs machined on its periphery are properly aligned with the appropriate attachment holes as represented on the platen 61 by the pins 59, 67 and 81.

It should now be noted that inasmuch as annular member 28 of sprocket wheel 19 needs to be molded to have anywhere from 39 to 48 teeth, each having a different diameter, there may be as many as 10 different diameter size molds 60 comprised of platens 61 and 62. However, only three size spiders are provided for use with these different molds so the reason for providing the separate insert 69 for the mold is twofold. One is that it is easier to machine the periphery of the insert 69 rather than to cut cavities in the movable platen 61 with the sets of different arcs needed to accomodate the arms of the three different size spiders. The other reason is that the same insert 69 can be used with more than one diameter size movable platen 61.

The fixed platen 62 for the mold equipment is formed by machining a cylindrical blank with a circular recess 71 therein having a radius corresponding to the circular recess 64 in the movable platen 61 and having a depth corresponding to the shoulder on the other side of body portion 30. A hole 74 is then drilled in the center of fixed platen 62 to form a sprue.

The movable and fixed platens 61 and 62 when assembled form the cavity 80 as shown in FIG. 9 for injection molding of the annular member 28. The thermoplastic material used is a tough relatively resilient nylon having the properties of a resin commercially available under the tradename Zytel ST-801. The molten plastic is injected through the centrally located sprue 74 in the fixed platen 62 and through the five radially disposed insert runners 78 which extend perpendicularly thereto and terminate in the gates 79 which conduct the molten plastic material symmetrically about the cavity 80. In this manner the molten plastic is seen to radiate outwardly from the insert runners 78 and simultaneously fill cavity 80. This provides a balanced flow and pressure condition of the molten plastic which reduces to a minimum any differential in shrinkage and warpage in the molded product.

After annular member 28 is molded, it is removed from the mold 60 by injecting pins, such as pins 86 disposed opposite the runners in the insert 69, as well as others, not shown, provided in the movable platen 61. The molded annular member 28 is then trimmed of the sprue and the runners.

It should now be clearly understood that conventionally bicycle sprocket wheels are cut from metal plates and the teeth are machined to have curved front and back faces and with the roots of the teeth rounded adjacent the rim of the sprocket wheel. One reason for rounding the corners of the roots of the teeth is to enable the sprocket wheel to be fully rooted against a roller 22 of the roller chain 21 when a tooth 33 thereof takes on the load of the chain. The other reason for this shape is to avoid stress concentrations which result from having sharp corners at that point of the metal tooth 33. This concentration of stress at the corners is one of the major reasons why teeth break off under heavy loads.

However, it should now be clear that the plastic annular member 28 which forms a part of the sprocket wheel 19 of the present invention need not have teeth with curved faces and backs nor do the rim connecting root portions of the teeth 33 need to be rounded so as to fully seat the rollers of the chain. This is because the wheel sprocket annular member 28 is molded of a tough elastic or resilient nylon plastic. The recognition of this permissable variation in the structure of sprocket wheel 19 greatly simplifies the manufacture of the mold equipment.

It should be noted from FIG. 5 that such a construction of the plastic annular member 28 on the sprocket wheel 19 provides, at most, for only a two point contact 89 and 90 of a roller 22 of the roller chain 21 against a toothed periphery of the sprocket wheel 19. However, since the teeth 33 are formed of a tough resilient material they tend to slightly conform under a heavy load to the shape of the roller 22 such that actually a slightly greater area of contact is provided. Furthermore, since the teeth 33 bend and tend to remain in contact with the rollers 22 of the roller chain 21 as the latter is advanced by the teeth 33 of the sprocket wheel 19, this resilient action of the teeth results in less impact and noise. In any event, since the sprocket teeth 33 are made of a tough resilient plastic, they engage the rollers 22 with considerably less noise and with a resiliency that greatly lessens the shock.

It should be understood that if a metal sprocket were provided with teeth having straight working faces and roots which make a sharp corner with an arcuate portion of a common circumference, the two point contact of a roller 22 of roller chain 21 on the toothed periphery would cause points of high pressure concentration when under a heavy load which could cause the metallic toothed periphery to be permanently deformed.

Figure 5A:
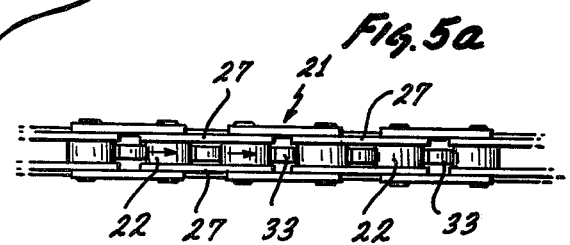
FIG. 5a is a partial view taken in the direction of arrows 5a—5a in FIG. 5 showing the teeth of the annular member of the sprocket wheel engaging the rollers of the chain.

It should be further noted that conventional metal sprockets have teeth that are machined to be tapered on the axial sides thereof. This is done to enable the teeth to readily enter the openings provided between the pin link plates 27 of the roller chain, as illustrated in FIG. 5a. However, it would be very costly to make a mold for the injection molding teeth having a shape which tapers or is rounded near the tip of their thickness in the axial direction. Thus, the teeth are molded on annular member 28 with a constant thickness, as illustrated in FIG. 4a. However, when the sprocket wheel 19 made with annular member 28 is initially placed on the bicycle, and the bicycle is driven, the side edges of the metal pin link plates 27 of the chain hit the upper side edges of the teeth 33 (FIG. 5a). This is a shearing action and during the first few minutes of riding the bicycle, which constitutes a break-in-period, the link plates 27 of the roller chain 31 chip away at the side edges 54 of the teeth 33 and taper them off to the shape shown in FIG. 10. Thus, although a clicking noise is heard during this initial break-in-period, thereafter, the chain quietly and smoothly engages the sprocket wheel 10. It should now be clear that this important shaping of the teeth 33 is automatically provided for on the plastic annular member 28 of the sprocket wheel 19 of the present invention during the first few minutes of actual use on a bicycle, whereas this shape must be machined on the teeth of a metal sprocket wheel.

It should now be clearly understood that the metal spider 24 provides for adding structural rigidity to the plastic annular member 28 of the sprocket wheel 19. However, if a bicycle rider happens to fall with his bicycle during racing, for example, a metal sprocket wheel may become permanently bent because the impact of the fall exceeds the elastic limit of the metal of which the sprocket wheel is made. This necessitates the replacing of the entire sprocket wheel. On the other hand, when using a sprocket wheel comprising a plastic outer annular member 28, with a metal spider 25 attached thereto, if the sprocket wheel becomes bent due to a fall, it is merely necessary to detach therefrom the bent metal spider. The plastic annular member 28 will then straighten out by itself to its original shape such that it can be mounted on another metal spider 25. This is because the sprocket annular member 28 is made of a tough resilient nylon plastic material which has a greater elastic limit than the steel or aluminum plates for example from which the metal sprocket wheels are made. This property of the plastic annular member 28 also emphasizes the need and the importance of the metal spider for providing structural rigidity to the sprocket wheel.

Although a preferred embodiment of the present invention has been illustrated and described in detail, it will be apparent to those skilled in the art that various modifications may be made therein without departing from the spirit of the invention or from the scope of the appended claims.

What is claimed is:

1. In a sprocket wheel for a bicycle,
a molded plastic annular member having a rim provided on a structurally reinforced body portion,
said rim portion having radially extending teeth with straight front and back faces,
the thickness of the teeth to the tip thereof being of the same thickness as said rim portion,
the surfaces between successive teeth defining arcuate portions of a common circumference which extend from the base of the straight front face of a tooth to the base of the straight back face of an adjacent tooth, and
the inner edge of said annular member defining a plurality of sets of equally spaced arcuate sectors, the inner edges of the arcuate sectors in each set having a common radius different from the radii of the other sets, and each of said arcuate sectors having an attachment hole molded therein.

2. A sprocket wheel for a bicycle comprising:
a molded plastic annular member having a rim portion provided on a structurally reinforced body portion,
said rim portion having radially extending teeth with straight front and back faces,
the thickness of the teeth to the tip thereof being of the same thickness as said rim portion,
the surfaces between successive teeth defining arcuate portions of a common circumference which extend from the base of the straight front face of a tooth to the base of the straight back face of an adjacent tooth,
the inner edge of said annular member defining a plurality of sets of equally spaced arcuate sectors, the inner edges of the arcuate sectors in each set having a common radius different from the radii of the other sets, and each of said arcuate sectors having an attachment hole molded therein,
a metal spider disposed in the center of said annular member and having a plurality of radial arms corresponding to the plurality of arcuate sectors, each said arm having an offset end portion with a hole which is aligned with an attachment hole in an arcuate sector when the shoulder of the offset end portion abuts the edge of said arcuate sector, and
attachment means fitted in each pair of aligned holes for attaching said spider to said annular member.

3. In a sprocket wheel for a bicycle,
a molded plastic annular member having a rim portion provided on a thickened flat-sided body portion,
said rim portion having radially extending teeth with the thickness of said teeth to the tip thereof being of the same thickness as the outer periphery of said rim portion,
the inner edge of said annular member defining a plurality of sets of equally spaced arcuate sectors, the inner edges of the arcuate sectors in each set having a common radius different from the radii of the other sets, and
each said arcuate sectors having an attachment hole therein.

4. A sprocket wheel for a bicycle comprising:
a molded nylon annular member having a rim portion provided on a thickened flat-sided body portion,
said rim portion having radially extending teeth with the thickness of said teeth to the tip thereof being of the same thickness as the outer periphery of said rim portion,
the inner edge of said annular member defining a plurality of sets of equally spaced arcuate sectors, the inner edges of the arcuate sectors in each set having a common radius different from the radii of the other sets, and each of said arcuate sectors having an attachment hole molded therein,
a metal spider centered on said annular member and having a plurality of radial arms corresponding to the plurality of arcuate sectors, each said arm having an offset end portion with a hole which is aligned with an attachment hole in an arcuate sector, and
attachment means fitted in each pair of aligned holes for detachably securing said spider to said annular member.

5. A sprocket wheel for a bicycle comprising:
a molded nylon annular member having a rim portion provided on a thickened flat-sided body portion,
said rim portion having a plurality of teeth formed with flat working surfaces radially extending therefrom in circumferentially equally spaced arrangement for engaging rollers in a metal roller chain drive,
the inner edge of said annular member defining a plurality of sets of equally spaced arcuate sectors, the inner edges of the arcuate sectors in each set having a common radius different from the radii of the other sets, and each of said arcuate sectors having an attachment hole molded therein,
a metal spider centered on said annular member and having a plurality of radial arms corresponding to the plurality of arcuate sectors, each said arm having an offset end portion with a hole which is aligned with an attachment hole in an arcuate sector, and
attachment means fitted in each pair of aligned holed for detachably securing said spider to said annular member.

6. In a sprocket wheel for a bicycle,
an annular member including
a rim portion with radially extending teeth, and
a body portion having an inner edge shaped to form a plurality of sets of equally spaced arcuate sectors,
the inner edges of the arcuate sectors in each set having a common radius different from the radii of the other sets, and
the arcuate sectors in each set having an attachment hole located at a common radius different from the radii of the other sets.

* * * * *